United States Patent [19]
Reynolds

[11] Patent Number: 5,819,900
[45] Date of Patent: Oct. 13, 1998

[54] PIN-TYPE SYNCHRONIZER

[75] Inventor: Joseph D. Reynolds, Climax, Mich.

[73] Assignee: Eaton Corporation, Cleveland, Ohio

[21] Appl. No.: 782,163

[22] Filed: Jan. 13, 1997

[51] Int. Cl.⁶ .................................................. F16D 11/00
[52] U.S. Cl. ................................. 192/53.31; 192/53.332
[58] Field of Search .................... 74/339; 192/53.3, 192/53.33, 53.331, 53.332, 53.34, 53.343, 53.341

[56] References Cited

U.S. PATENT DOCUMENTS

| | | | |
|---|---|---|---|
| 3,910,390 | 10/1975 | Eichinger | 192/53.332 |
| 5,065,855 | 11/1991 | Nellums | 192/53.332 |
| 5,092,439 | 3/1992 | Reynolds | 192/53.3 |
| 5,425,437 | 6/1995 | Nelluns | 192/53 F |
| 5,558,194 | 9/1996 | Cox | 74/339 X |

*Primary Examiner*—Charles A. Marmor
*Assistant Examiner*—Marcus Charles
*Attorney, Agent, or Firm*—Paul S. Rulon; Howard D. Gordon

[57] ABSTRACT

A pin-type, double-acting synchronizer mechanism (10) with friction members (34, 46 and 36, 48), jaw members (30, 38 and 32, 40) axially secured together by retainers (44), three circumferentially spaced pins (50) including blocker shoulders for preventing asynchronous engagement of the jaw clutches, and pre-energizer assemblies (52) to ensure initial engagement of the friction rings and blocker shoulders in response to initial engaging movement of a shift flange (42), and self-energizing ramps (24c, 24d, 24e, 24f) defined by posts (24b) projecting from a hub (20) and self-energizing ramps (42g, 42h, 42,k, 43m) defined by the flange. The synchronizer includes improved jaw members and improved self energizing ramps.

10 Claims, 3 Drawing Sheets

PIN-TYPE SYNCHRONIZER

CROSS-REFERENCE TO RELATED APPLICATIONS

This application is related to U.S. application Ser. Nos. 08/714,730; 08/714,731; 08/714,732 and 08/715,262, all filed Sep. 16 1996. All of these applications are assigned to the assignee of this application.

FIELD OF THE INVENTION

This invention relates to improvements a pin-type synchronizer for a transmission.

BACKGROUND OF THE INVENTION

It is well known in the multiple speed ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. However, such synchronizer mechanisms are not limited to truck use. Prior art examples of synchronizers that are relevant to the synchronizer herein may be seen by reference to U.S. Pat. Nos. 5,092,439; 5,339,936 and 5,425,437 which are incorporated herein by reference.

SUMMARY OF THE INVENTION

An object of this invention is to provide a pin-type synchronizer with an improved jaw member arrangement.

Another object of this invention is to provide pin-type synchronizer with an improved self-energizing arrangement.

According to one feature the invention, a pin-type synchronizer, as disclosed in U.S. Pat. No. 5,092,439 and representing the prior art, includes a pin-type synchronizer selectively operative to frictionally synchronize and positive connect either of first and second drives respectively mounted for relative rotation on first and second cylindrical surfaces of a shaft having an axis. The synchronizer includes first and second jaw members affixed respectively to the first and second drives and respectively engagable with axially movable third and fourth jaw members positioned between the drives. The third and fourth jaw members have internal splines slidably mating for non-relative rotation with external splines affixed to the shaft. First and second friction members are respectively secured for rotation with the first and second drives. Third and fourth friction members are concentric to the shaft and axially movable between the drives for frictional engagement respectively with the first and second friction members to provide a synchronizing torque for synchronizing the drives with the shaft. A radially extending flange has axially oppositely facing sides positioned between the third and fourth jaw members and between the third and fourth friction members for axially moving the jaw members and friction members into said engagement in response to an axial bidirectional shift force ($F_o$) applied to the flange. Blocker means are operative when engaged for preventing engagement of the jaw members prior to the synchronizing. The blocker means include a plurality of circumferentially spaced apart pins rigidly extending axially between the third and forth friction members and into a first set of openings in the flange Each of the pins has a blocker shoulder engagable with a blocker shoulder defined about the associated opening. Retainer means secure the flange against axial movement relative to the third and fourth jaw members. Pluralities of first and second self-energizing ramps are respectively affixed against axial and radial movement relative to the flange and shaft. Said first and second ramps are engagable in response to the synchronizing torque for producing an axial additive force ($F_a$) on the flange in the direction of the shift force ($F_O$) for increasing the total force engaging the friction members.

The improvement is characterized by an annular hub axially interposed between the drives and having an outer circumference greater in diameter than diameters of the cylindrical surfaces The annular hub is affixed against axial and radial movement relative to the shaft and the external splines that are affixed to the shaft are formed in the outer circumference the annular hub. The first and second jaw members are defined by external splines affixed thereto. The third and fourth jaw member internal splines mate continuously with the external splines of the annular member. The third and fourth jaw member internal splines are respectively engagable with external splines of the first and second jaw members for effecting the positive connection between the drive and shaft.

According to another feature the invention, the pin-type synchronizer, includes an improvement characterized by an annular hub concentric to and affixed against rotation relative to the shaft and axially interposed between the drives. The hub includes first and second rings and a center ring disposed therebetween. The first and second rings include the external splines affixed to the shaft. The center ring includes radially outwardly projecting means defining the plurality of second ramp means.

According to yet another feature the invention, includes an improvement characterized by an annular hub concentric to and affixed against rotation relative to the shaft and axially interposed between the drives. The hub includes a radially outwardly facing surface having an outer diameter greater than the diameter of the first and second cylindrical surfaces and having an axially center portion with a plurality radially outward projections circumferentially spaced apart and defining the plurality of second ramps. The surface includes on axially opposite sides of the center portion the external splines slidably mating with the first and second jaw member internal splines and with the outer diameter of the external splines are less than the diameter of the second ramps.

BRIEF DESCRIPTION OF THE DRAWINGS

The self-energizing synchronizer mechanism of the invention is shown in the accompanying drawings in which:

FIG. 6 is a perspective view of a component of the synchronizer; and

DETAILED DESCRIPTION OF THE DRAWINGS

Figure 1:
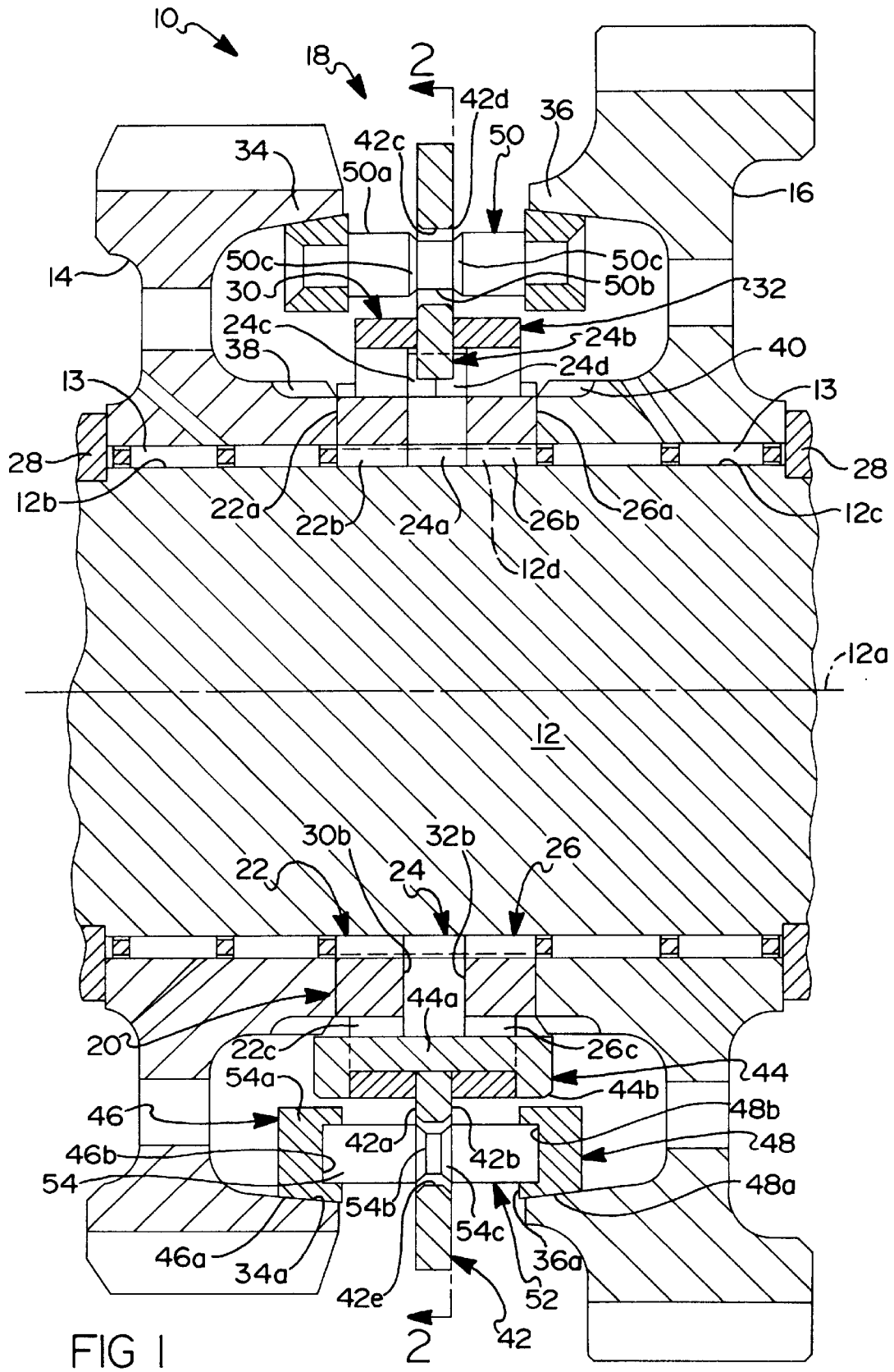
FIG. 1 is a sectional view of a somewhat schematically illustrated double-acting synchronizer mechanism in a neutral position and looking along line 1—1 in FIG. 2.
Figure 2:
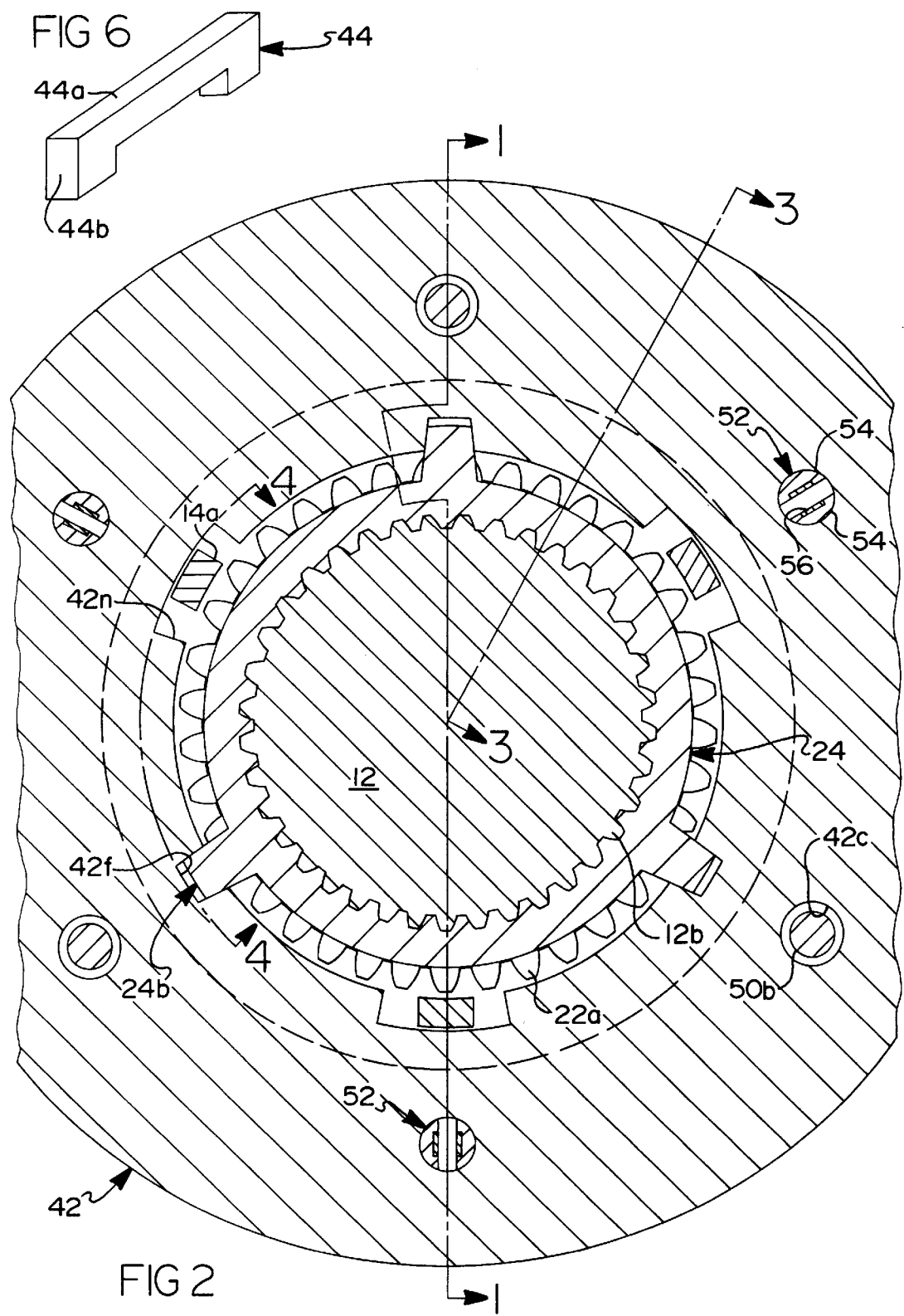
FIG. 2 is a partially broken away sectional view of the synchronizer looking along line 2—2 in FIG. 1.
Figure 3:
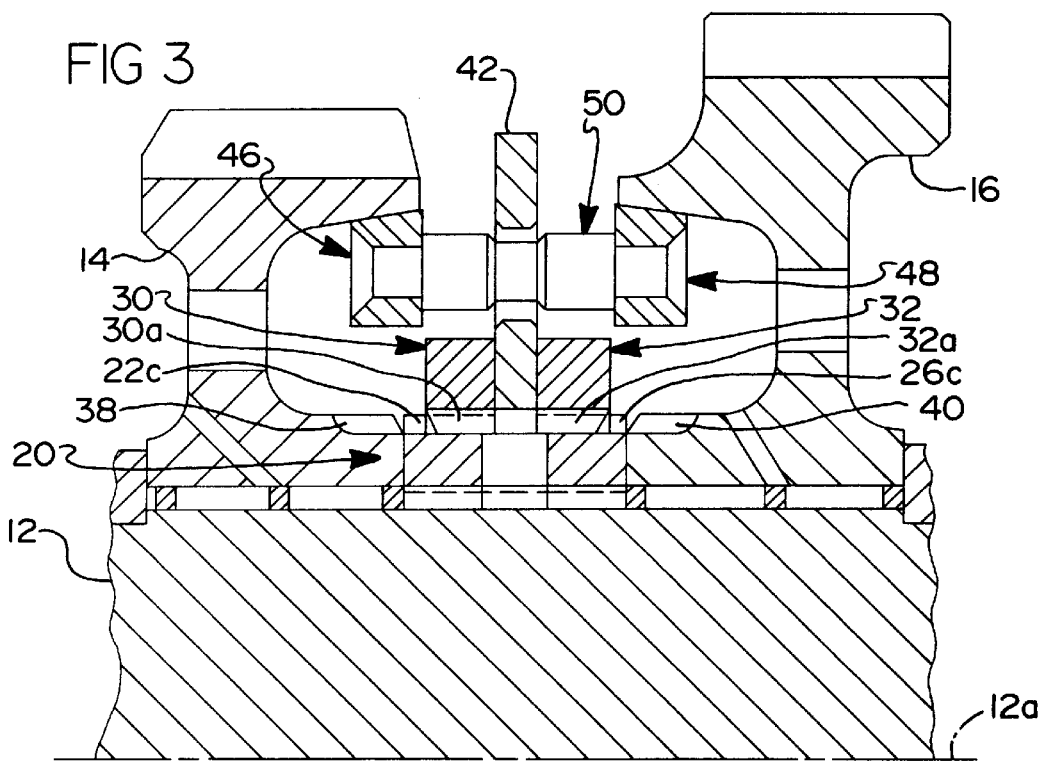
FIG. 3 is a reduced size partial view of the synchronizer in section and looking along line 3—3 in FIG. 2.

The term "synchronizer clutch mechanism", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing clutch in relation to the synchronizing torque of the friction clutch.

Looking now at the drawings, therein is shown a gear and double acting synchronizer assembly 10 the gear assembly includes a shaft 12 to be mounted for rotation in a transmission about an axis 12a and axially spaced apart drives or gears 14, 16. The shaft 12 includes cylindrical surfaces 12b, 12c rotatably supporting the gears thereon via bearings 13.

The double-acting synchronizer 18 includes an annular hub 20 having an outer circumference greater in diameter than the diameters of the cylindrical surfaces. The hub includes three rings 22, 24, 26 and has an axial length separating the gears via axially oppositely facing shoulders 22a, 26a which limit axial movement of the gears toward each other. Axial movement of the gears away from each other is limited by partially shown stops 28. Shaft splines 12d mate with ring internal splines 22b, 24a, 26b to prevent relative rotation therebetween. The outer circumference of rings 22, 26 include external splines 22c, 26c that slidably and nonrotatably mate with internal splines 30a, 32a of jaw members 30, 32. The center ring 24 includes three radially outwardly projecting posts 24b defining self-energizing ramps 24c, 24d, 24e, 24f explained further hereinafter. Synchronizer 18 further includes friction rings 34, 36 and jaw member external splines 38, 40 integrally formed with gears 14,16, the jaw members 30, 32, a radially extending shift flange 42 having axially oppositely facing sides 42a, 42b sandwiched between axially facing surfaces 30b, 32b of the jaw members 30, 32, three axially extending retainers 44 for securing the flange and jaw members against relative axial movement, annular friction rings 46, 48 rigidly secured together by three circumferentially spaced apart pins 50 extending axially from each of the friction members and through openings 42c in the flange, and three pre-energizer assemblies 52.

The friction rings have cone friction surfaces 34a, 46a and 36a, 48a that engage for frictionally synchronizing the gears to the shaft prior to engagement of the jaw members. A wide range of cone angles may be used. Cone angles of seven and one-half degrees may be employed. The friction surfaces 46a, 48a and/or 34a, 36a may be defined by any of several known friction materials affixed to the rings. Pyrolytic carbon friction materials, such as disclosed in U.S. Pat. Nos. 4,700,823; 4,844,218; and 4,778,548 may be used. These patents are incorporated herein by reference.

Pins 50 each include major diameter portions 50a having diameters slightly less than the diameter of flange openings 42c, a reduced diameter or groove portion 50b spaced between friction rings 46, 48 (herein midway), and conical blocker shoulders or surfaces 50c extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders 42d defined about the flange openings 42c. The pins may be secured to friction rings 46, 48 in any of several known manners.

The pre-energizer assemblies 52 may be any of several known types, herein they are of the split pin-type which are more completely shown and described in previously mentioned U.S. Pat. No. 5,339,936. Each pre-energizer assembly extends axially between the friction rings 46, 48 and through openings 42e which are alternately spaced between openings 42c. Each pre-energizer assembly, includes two identical shells 54 having opposite ends 54a disposed in circumferentially spaced and axially opening recesses 46b, 48b in rings 46, 48 and at least two identical leaf springs 56 sandwiched between and biasing the shells apart. The recesses 46b, 48b are elongated (not shown) in the circumferential direction of the friction rings and are of sufficient diameter in the radial direction of the friction rings to allow sliding movement of opposite ends 54a of the shells 54. Each pair of shells 54 has a major diameter less than the diameter of its associated opening 42e when squeezed together, and the shells have semi-annular grooves 54b with chamfered end surfaces 54c, and the ends 54a. As is known, ends 54a react against friction rings 46, 48 and chamfers 54c react against chamfers about openings 42e in flange 42 in response to initial engaging movement of flange 42, thereby effecting initial engagement of either friction clutch and initial synchronizing torque for rotating pins 50 relative to flange 42 and positioning the blocker shoulders for engagement.

As previously mentioned, jaw members 30, 32 include internal spline teeth 30a, 32a slidably mating with external spline teeth 22c, 26c defined by rings 22, 26 which are affixed relative to the shaft. The external splines 22c, 26c have flank surfaces extending parallel to the shaft axis and the mating thereof with flank surfaces of the jaw member splines prevents relative rotation therebetween.

Flange 42 further includes radially inwardly opening recesses 42f receiving posts 24b of center ring 24. Each recess includes radially extending sides circumferentially facing each other and respectively defining self-energizing ramps 42g, 42h and 42k, 42m. During synchronization of gear 14 either ramps 42g react against ramps 24f or ramps 42h react against ramps 24d to provide an additive axial force ($F_a$) in the direction of gear 14. During synchronization of gear 16 either ramps 42k react against ramps 24c or ramps 42m react against ramps 24e to provide an additive axial force ($F_a$) in the direction of gear 16. As explained further hereinafter, the additive axial forces ($F_a$) add to an operator shift forces ($F_o$) applied to shift flange 42. The ramp surfaces allow limited rotation of the flange relative to jaw members 30, 32. When the ramps of flange 42 and center ring 24 are engaged, they react synchronizing torque from the cone clutches to shaft 12 to provide the additive axial forces for increasing the engaging force of the cone clutches initially engaged by a shift force applied to flange 42, thereby increasing the synchronizing torque provided by the cone clutches. The ramp surfaces may be provided for increasing synchronizing force for one or both gears and/or for increasing synchronizing force in response to torque in either direction, as is encountered for up and down shifts.

The retainers 44 each include an axially extending portion 44a snugly disposed in axially extending slots 30c, 32c in jaw members 30, 32 and axially spaced apart and radially outwardly extending portions 44b embracing axially oppositely facing sides 30d, 32d of jaw members 30, 32. The retainers loosely extend through opening 42n in flange 42 for allowing limited relative rotation therebetween.

Ramp surfaces 24d, 24f respectively react against ramp surfaces 42h, 42g to provide the additive axial forces for gear 14 in response to synchronizing torque in either direction. Ramp surfaces 24c, 24e affixed to shaft 12 via ring 24 respectively react against ramp surfaces 42k, 42m on the sides of flange recesses 42f to provide additive axial forces to increase or assist the synchronization rate and/or shift quality of gear 16 in response to torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the shaft axis, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 42 by a shift fork may be varied by varying the ramp angles and/or the mean radii ratio.

Figure 7:
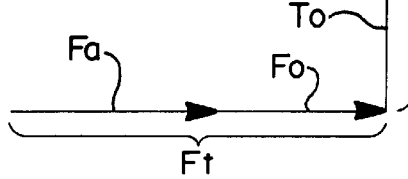
FIG. 7 is a graphical representation of axial forces and torques acting on a shift flange of the synchronizer.

When the flange 42 is in the neutral position of FIG. 1, reduced diameter portions 50b of pins 50 are aligned with their associated flange openings 42c, friction surfaces of the cone clutches are slightly spaced apart and are maintained in this spaced relation by chamfered or angled pre-energizer surfaces 54c of the pre-energizers 52 acting on pre-energizer chamfered surfaces about flange openings 42e by the force of springs 56. The axial force provided by the pre-energizer surfaces is preferably sufficient to prevent inadvertent engagement of the self-energizing ramps due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 42 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 42 in an axial direction and is represented by the length of arrow $F_o$ in FIG. 7.

Initial rightward axial movement of flange 42 by the operator shift force $F_o$ is transmitted to friction member 48 by pre-energizer surfaces 54c to effect initial frictional engagement of cone surface 48a with cone surface 36a. The initial engagement force on the cone surface is of course a function of the force of springs 56 and the angles of the pre-energizer surfaces. The initial frictional engagement (provided an asynchronous condition exists and momentarily ignoring the effect of the self-energizing ramps) produces an initial cone clutch engaging force and initial synchronizing torque which ensures limited relative rotation between flange 42 and the engaged friction ring, and hence, movement of the reduced diameter pin portions 50b to the appropriate sides of the flange openings 42c to provide engagement of pin blocker shoulders 50c with the blocker shoulders 42d disposed about openings 42c. When the blocker shoulders are engaged, the full operator shift force $F_o$ on flange 42 is transmitted to friction ring 48 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 7. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 42c to allow continued axial movement of the flange and engagement of the internal spline/jaw teeth 32a of jaw member 32 with external spline/jaw teeth of jaw member 40 affixed to gear 16. The spline/jaw teeth may be configured as shown in U.S. Pat. Nos. 3,265,173 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin\alpha \qquad (1)$$

where:

$R_c$=the mean radius of the cone friction surface, $\mu_c$=the coefficient of friction of the cone friction surface, and $\alpha$=the angle of the cone friction surfaces.

Figure 4:
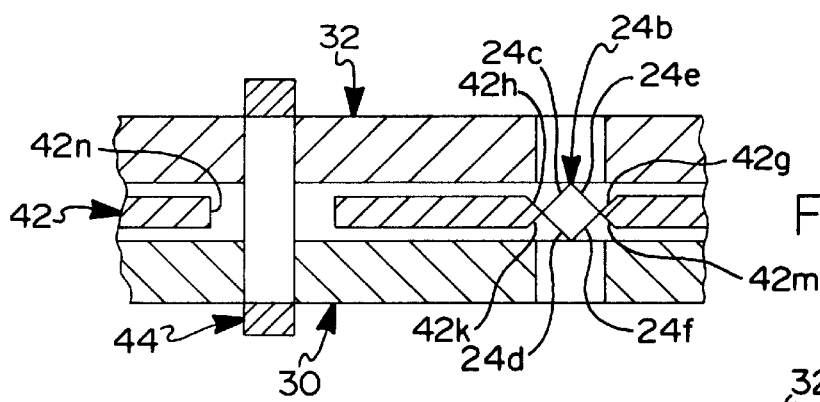
FIG. 4 is a reduced size partial view of the synchronizer in section and looking along line 4—4 in FIG. 2.
Figure 5:
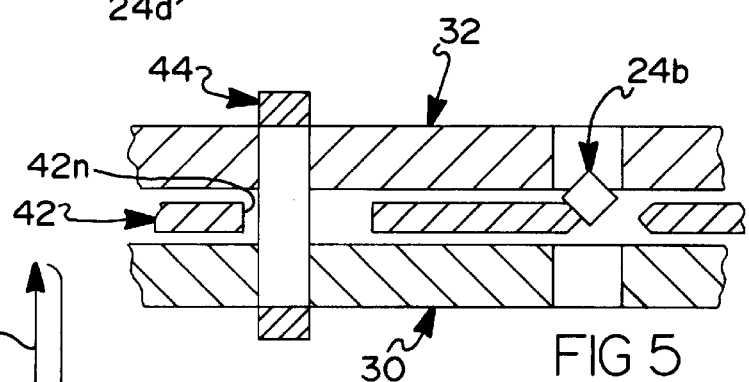
FIG. 5 illustrates an engaged position of self-energizing ramps in FIG. 4.

Looking now at the affects of the self-energizing ramps and referring particularly to FIGS. 4 and 5, the synchronizing torque $T_o$, due to the operator applied axial shift force $F_o$, is of course transmitted to flange 42 by pins 50 and is reacted to shaft 12 across the self-energizing ramp surfaces. The self-energizing ramp surfaces, when engaged, limit rotation of the flange relative to shaft 12 and jaw members 30, 32, and produce an axial force component or axial additive force $F_a$ acting on the flange in the same direction as shift force $F_o$, which forces sum to provide a total force $F_t$, thereby further increasing the engaging force of the cone clutch to provide an additive synchronizing torque $T_a$ which adds to the torque $T_o$ to provide a total torque $T_t$. FIG. 4 illustrates the position of the self-energizing ramp surfaces while shift flange 42 is in the neutral position corresponding to the position of FIG. 1. FIG. 5 illustrates a position of the ramps while gear 14 is being synchronized by engaged cone surfaces 34a, 46a. The engaged cone surfaces are producing a synchronizing torque in a direction which has effected engagement of flange ramp surfaces 42h with hub ramp surfaces 24d affixed to shaft 12. Hence, the sum of the axial forces for engaging the cone clutch are $F_o$ plus $F_a$ and the sum of the synchronizing torques being produced by the cone clutch are $T_o$ plus $T_a$, as graphically shown in FIG. 7. For a given operator shift force $F_o$ and an operator synchronizing torque $T_o$, the magnitude of the axial additive force is preferably a function of the angles of the engaged self-energizing ramp surfaces. These angles are preferably great enough to produce an additive force $F_a$ of magnitude sufficient to significantly increase synchronizing torque and decrease synchronizing time in response to a given moderate shift effort by the operator. However, these angles are also preferably low enough to produce a controlled axial additive force $F_a$, i.e., the force $F_a$ should increase or decrease in response to the force $F_o$ increasing or decreasing. If the ramp angles are too great, the ramps are self-locking rather than self-energizing; hence, once initial engagement of the cone clutch is effected the force $F_a$ will rapidly and uncontrollably increase independent of the force $F_o$, thereby driving the cone clutch toward uncontrolled lockup. Self-locking rather than self-energizing decreases shift quality or shift feel, may over stress synchronizer components, may cause over heating and rapid wear of the cone clutch surfaces, and may even override operator movement of the shift lever.

The main variables and equations for calculating self-energizing ramp angles may be seen by reference to previously mentioned U.S. Pat. No. 5,092,439.

A preferred embodiment of a pin-type synchronizer has been disclosed. The following claims are intended to cover inventive portions of the disclosed sychronizer and variations and modifications believed to be within the spirit of the invention.

What is claimed is:

1. A pin-type synchronizer selectively operative to frictionally synchronize and positive connect either of first and second drives respectively mounted for relative rotation on first and second cylindrical surfaces of a shaft having an axis; the synchronizer including:

first and second jaw members affixed respectively to the first and second drives and respectively engagable with axially movable third and fourth jaw members positioned between the drives, the third and fourth jaw members having internal splines slidably mating for non-relative rotation with external splines affixed to the shaft;

first and second friction members respectively secured for rotation with the first and second drives and third and fourth friction members concentric to the shaft and axially movable between the drives for frictional engagement respectively with the first and second friction members to provide a synchronizing torque for synchronizing the drives with the shaft;

a radially extending flange having axially oppositely facing sides positioned between the third and fourth jaw members and between the third and fourth friction members for axially moving the jaw members and friction members into said engagement in response to an axial bidirectional shift force ($F_O$) applied to the flange;

blocker means operative when engaged for preventing engagement of the jaw members prior to the synchronizing, the blocker means including a plurality of circumferentially spaced apart pins rigidly extending axially between the third and forth friction members and into a first set of openings in the flange, each of the pins having a blocker shoulder engagable with a blocker shoulder defined about the associated opening;

retainer means securing the flange against axial movement relative to the third and fourth jaw members;

pluralities of first and second self-energizing ramps respectively affixed against axial and radial movement relative to the flange and shaft, said first and second ramps engagable in response to the synchronizing torque for producing an axial additive force ($F_a$) on the flange in the direction of the shift force ($F_O$) for increasing the total force engaging the friction members; the improvement comprising:

an annular hub axially interposed between the drives and having an outer circumference greater in diameter than diameters of the cylindrical surfaces, the annular member affixed against axial and radial movement relative to the shaft and the external splines affixed to the shaft formed in the outer circumference of the annular hub;

the first and second jaw members being defined by external splines affixed thereto, the third and fourth jaw member internal splines mating continuously with the external splines of the annular hub, and the third and fourth jaw member internal splines respectively engagable with external splines of the first and second jaw members.

2. The synchronizer of claim 1, wherein:

the annular hub including first and second rings and a center ring disposed therebetween, the first and second rings defining the external splines affixed to the shaft, and the center ring including radially outwardly projecting means defining the plurality of second ramps.

3. The synchronizer of claim 2, wherein:

the shift flange includes a plurality of radially inwardly opening recesses each receiving one of the projecting means, each recess having substantially radially extending sides circumferentially facing each other and each having at least one ramp of the first ramps, and each projecting means including axially oppositely facing sides each having at least one ramp of the second ramps.

4. A pin-type synchronizer selectively operative to frictionally synchronize and positive connect either of first and second drives respectively mounted for relative rotation on first and second cylindrical surfaces of a shaft having an axis; the synchronizer including:

first and second jaw members affixed respectively to the first and second drives and respectively engagable with axially movable third and fourth jaw members positioned between the drives, the third and fourth jaw members having internal splines slidably mating for non-relative rotation with external splines affixed to the shaft;

first and second friction members respectively secured for rotation with the first and second drives and third and fourth friction members concentric to the shaft and axially movable between the drives for frictional engagement respectively with the first and second friction members to provide a synchronizing torque for synchronizing the drives with the shaft;

a radially extending flange having axially oppositely facing sides positioned between the third and fourth jaw members and between the third and fourth friction members for axially moving the jaw members and friction members into said engagement in response to an axial bidirectional shift force ($F_O$) applied to the flange;

blocker means operative when engaged for preventing engagement of the jaw members prior to the synchronizing, the blocker means including a plurality of circumferentially spaced apart pins rigidly extending axially between the third and forth friction members and into a first set of openings in the flange, each of the pins having a blocker shoulder engagable with a blocker shoulder defined about the associated opening;

retainer means securing the flange against axial movement relative to the third and fourth jaw members;

pluralities of first and second self-energizing ramps respectively affixed against axial and radial movement relative to the flange and shaft, said first and second ramps engagable in response to the synchronizing torque for producing an axial additive force ($F_a$) on the flange in the direction of the shift force ($F_O$) for increasing the total force engaging the friction members; the improvement comprising:

an annular hub concentric to and affixed against rotation relative to the shaft and axially interposed between the drives, the hub including first and second rings and a center ring disposed therebetween, the first and second rings including the external splines affixed to the shaft, and the center ring including radially outwardly projecting means defining the plurality of second ramps.

5. The synchronizer of claim 4, wherein:

the shift flange includes a plurality of radially inwardly opening recesses each receiving one of the projecting means, each recess having substantially radially extending sides circumferentially facing each other and each having at least one ramp of the first ramps, and each projecting means including axially oppositely facing sides each having at least one ramp of the second ramps.

6. The synchronizer of claim 5, wherein:

the first and second rings each have an outer circumference greater in diameter than diameters of the cylindrical surfaces and each ring outer circumference including a set of the external splines affixed to the shaft;

the first and second jaw members being defined by external splines affixed thereto, the third and fourth jaw member internal splines mating with the external splines of the first and second rings, and the third and fourth jaw member internal splines respectively engagable with external splines of the first and second jaw members.

7. A pin-type synchronizer selectively operative to frictionally synchronize and positive connect either of first and second drives respectively mounted for relative rotation on first and second cylindrical surfaces of a shaft having an axis; the synchronizer including:

first and second jaw members affixed respectively to the first and second drives and respectively engagable with axially movable third and fourth jaw members positioned between the drives, the third and fourth jaw members having internal splines slidably mating for non-relative rotation with external splines affixed to the shaft;

first and second friction members respectively secured for rotation with the first and second drives and third and fourth friction members concentric to the shaft and axially movable between the drives for frictional engagement respectively with the first and second friction members to provide a synchronizing torque for synchronizing the drives with the shaft;

a radially extending flange having axially oppositely facing sides positioned between the third and fourth jaw members and between the third and fourth friction members for axially moving the jaw members and friction members into said engagement in response to an axial bidirectional shift force ($F_O$) applied to the flange;

blocker means operative when engaged for preventing engagement of the jaw members prior to the synchronizing, the blocker means including a plurality of circumferentially spaced apart pins rigidly extending axially between the third and forth friction members and into a first set of openings in the flange, each of the pins having a blocker shoulder engagable with a blocker shoulder defined about the associated opening;

retainer means securing the flange against axial movement relative to the third and fourth jaw members;

pluralities of first and second self-energizing ramps respectively affixed against axial and radial movement relative to the flange and shaft, said first and second ramps engagable in response to the synchronizing torque for producing an axial additive force ($F_a$) on the flange in the direction of the shift force ($F_O$) for increasing the total force engaging the friction members; the improvement comprising:

an annular hub concentric to and affixed against rotation relative to the shaft and axially interposed between the drives, the annular hub including a radially outwardly facing surface having an outer diameter greater than the diameter of the first and second cylindrical surfaces and having an axially center portion with a plurality radially outward projections circumferentially spaced apart and defining the plurality of second ramps, the radially outwardly facing surface of the annular hub including on axially opposite sides of the center portion the external splines slidably mating with the first and second jaw member internal splines, and the external splines of the annular hub having an outer diameter less than the maximum diameter of the radially outward projections.

8. The synchronizer of claim 7, wherein:

the annular hub includes internal splines mating with external splines defined on the shaft between the first and second cylindrical surfaces.

9. The synchronizer of claim 8, wherein:

the annular hub includes a center ring defining the center portion, and first and second rings disposed on axially opposite sides of the center ring and defining the external splines slidably mating with the first and second jaw member internal splines.

10. The synchronizer of claim 9, wherein:

the first and second jaw members being defined by external splines affixed thereto, and the third and fourth jaw member internal splines respectively engagable with external splines of the first and second jaw members for effecting the positive connection.

* * * * *